UNITED STATES PATENT OFFICE.

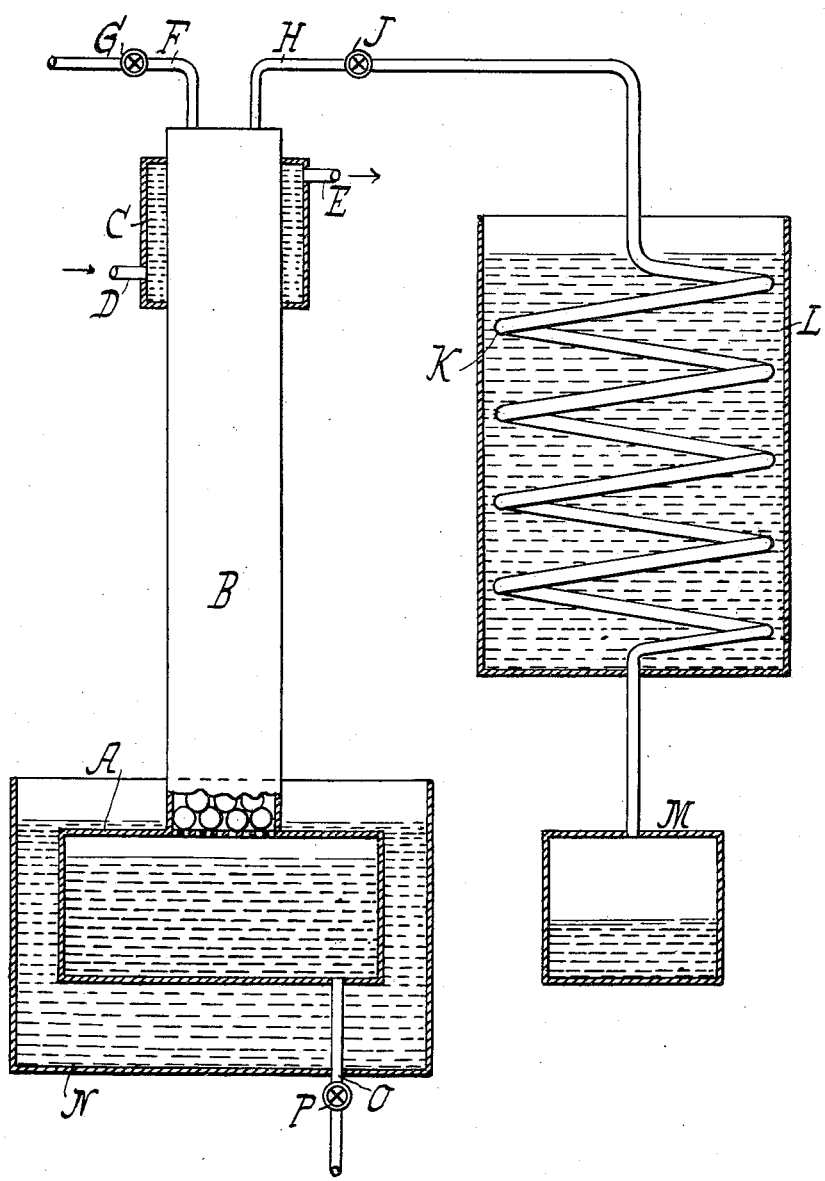

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

PURIFYING AMMONIA.

1,261,900.  Specification of Letters Patent.  Patented Apr. 9, 1918.

Application filed June 30, 1913. Serial No. 776,590.

*To all whom it may concern:*

Be it known that I, CARL BOSCH, a citizen of the German Empire, residing at Ludwigshafen-on-the-Rhine, Germany, have invented new and useful Improvements in Purifying Ammonia, of which the following is a specification.

When ammonia, which is obtained catalytically from its elements and liquefied, is employed for some purposes, in particular for the production of cold, certain disadvantages occur which do not occur when the ammonia hitherto generally on the market is employed. I have discovered that these disadvantages arise from the fact that the ammonia obtained as first mentioned contains dissolved, or uncombined, gases, in particular nitrogen and hydrogen, and that this is the case even if the ammonia be first absorbed in a suitable solvent under pressure, and I have found that ammonia which is impure in the sense indicated can be purified by subjecting it to fractional distillation, preferably under pressure.

The purification according to my invention can be carried out in any suitable manner, for instance the ammonia which has been produced under high pressure can be either condensed by cooling or be dissolved in water and subsequently separated therefrom and compressed in order to bring it into the liquid state and then be introduced into a distilling apparatus provided with a dephlegmator and a condenser. On distillation, the nitrogen and hydrogen contained in the ammonia are first evolved and are led away and, if desired, they can be washed with water to recover any ammonia which they may have carried away with them. As soon as it is found that pure ammonia is being evolved, the vapors are led through the condenser and the liquid ammonia is collected in the receiver. Any water and other impurities which may be present remain in the distilling vessel. The whole apparatus is under the pressure of the vaporized ammonia.

Another method consists in allowing the liquid ammonia to flow continuously down a fractionating column, so that dissolved gases, such as nitrogen and hydrogen, are driven away by the ascending ammonia fumes, the pure ammonia vapors being allowed to escape from a suitable point in the lower part of the column and being led through a condenser, and the pure liquid ammonia being collected in a receiver.

The drawing accompanying this specification illustrates in vertical section an apparatus suitable for use in carrying out the process of this invention, but I wish it to be understood that the invention is not in any way limited to the use of this apparatus. In the drawing A represents the vessel into which the liquid ammonia which is to be purified is placed, the ammonia being under an initial pressure of say ten atmospheres. Surrounding the vessel A is a water-bath N which can be heated and may commence with an initial temperature of say 30° C. and be gradually raised to about 60° C. The contents of the vessel A boil under pressure and pass through a column B which may be filled with clay balls, and the upper part of which is surrounded by a cooling-jacket C. The cooling jacket is supplied with water by means of the pipe D and the surplus flows away through the pipe E. To the top of the column B two pipes F and H with valves G and J respectively are attached for the purpose of leading away the products of distillation. When commencing the operation the valve J is closed and G is open, and by means of the fractionating column B, the distillate is fractionated so that gases consisting of, or rich in nitrogen and hydrogen pass away, while the main quantity of ammonia is returned to the vessel A. The gases leaving the pipe F are analyzed from time to time and when it is found that practically pure ammonia is coming over, the valve G is closed and the valve J is opened, so that the pure ammonia passes through the pipe H to the cooling-coil K situated in the cooling-tank L and collects in the liquid in the receiver M. When the distillation has proceeded sufficiently, the operation is broken off and a fresh quantity of impure ammonia is brought into the vessel A and the operation repeated. From time to time any residue of water and oil which collects in A can be let off through the pipe O and the valve P. I may mention by way of example, that the first part of the distillation to get rid of the nitrogen and hydrogen may require say two hours while the second part of the distillation may require say twelve hours, but of course these times will vary greatly and depend upon the apparatus used, upon the quantity of ammonia charged into the vessel A and upon the conditions of working.

Now what I claim is:—

1. The process of purifying liquid ammonia obtained catalytically from its elements by subjecting it to fractional distillation, to effect the separation of permanent gases absorbed therein.

2. The process of purifying ammonia in the liquid state obtained catalytically from its elements by subjecting it to fractional distillation under pressure, to effect the separation of permanent gases absorbed therein.

3. The process of producing ammonia from gases containing it under pressure by cooling the gases until the ammonia separates out, and then fractionally distilling the liquid ammonia and thus eliminating the nitrogen and hydrogen from the ammonia.

In testimony whereof I have hereunto set my hand in the presence of two subscribing witnesses.

CARL BOSCH.

Witnesses:
J. ALEC LLOYD,
JOSEPH PFEIFFER.